US012587769B2

(12) United States Patent
Zhang

(10) Patent No.: US 12,587,769 B2
(45) Date of Patent: Mar. 24, 2026

(54) WATERPROOF MICROPHONE DEVICE

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC ACOUSTIC TECHNOLOGIES (SHENZHEN) CO., LTD., Shenzhen (CN)

(*) Notice: Subject to any disclaimer, the term of this patent is extended or adjusted under 35 U.S.C. 154(b) by 167 days.

(21) Appl. No.: 18/743,088

(22) Filed: Jun. 13, 2024

(65) Prior Publication Data

US 2025/0274688 A1 Aug. 28, 2025

Related U.S. Application Data

(63) Continuation of application No. PCT/CN2024/078207, filed on Feb. 23, 2024.

(51) Int. Cl.
*H04R 1/02* (2006.01)
*H04R 1/04* (2006.01)

(52) U.S. Cl.
CPC ............... *H04R 1/021* (2013.01); *H04R 1/04* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 10,555,063 | B2 * | 2/2020 | Shahmurad | H04R 1/086 |
| 12,244,987 | B2 * | 3/2025 | Monteleone | H04R 1/04 |
| 2018/0084340 | A1 * | 3/2018 | Clyne | H04R 1/04 |
| 2024/0155279 | A1 * | 5/2024 | Zhang | H04R 1/04 |
| 2024/0292140 | A1 * | 8/2024 | Doi | H04R 1/04 |

* cited by examiner

*Primary Examiner* — Paul W Huber
(74) *Attorney, Agent, or Firm* — Wiersch Law Group

(57) ABSTRACT

The present invention provides a waterproof microphone device installed on a vehicle body. The vehicle body includes a frame having a circular opening. The waterproof microphone device includes an outer housing, a circuit board, a microphone, a cover, a first waterproof membrane, and a casing. An inner wall of the frame forming the opening gradually slopes inwardly from an outer surface to an inner surface of the frame. The casing includes a first wall, a second wall, and an outer sidewall. The outer sidewall gradually slopes inwardly from the first wall to the second wall to form an inclined annular sound channel between the inner wall of the frame enclosing the opening and the outer sidewall of the casing. In present invention, the waterproof microphone device can achieve better waterproof effect, and has a more stable structure with a beautiful appearance.

10 Claims, 3 Drawing Sheets

WATERPROOF MICROPHONE DEVICE

FIELD OF THE PRESENT INVENTION

The present invention relates to the field of microphone, and more particularly, to a waterproof microphone device in vehicle.

DESCRIPTION OF RELATED ART

With the development of technology, the application of microphones in vehicles is becoming increasingly widespread. In related art, the surface of the vehicle will be equipped with through holes as sound holes, and the microphone will be installed inside the vehicle. A waterproof membrane will be applied on the microphone, and the microphone will be connected to the outside of the vehicle through the sound holes. However, this structure will cause the release of turbulent energy and generate strong wind noise during the driving state, which will affect the reception of the microphone.

When washing the vehicle or in rainy weather, when the water flow vertically impacts on the surface of the vehicle, the gas inside the sound hole is violently compressed, which can easily cause damage to the internal structure of the microphone. The waterproof membrane will also be damaged by directly impacted of water flow. In addition, water stagnation near the sound hole can easily cause blockage, and freezing in cold weather is more likely to cause external pickup function failure. Moreover, when washing a vehicle with hot water, water vapor will penetrate the waterproof membrane and condense in the internal channels, making it difficult to discharge.

Therefore, it is desired to provide a new waterproof microphone device which can overcome the above problems.

SUMMARY

In view of the above, the embodiments of the present invention provide a new waterproof microphone device which has a stable structure and good waterproof effect.

The present invention provides a waterproof microphone device. The waterproof microphone device is installed on a vehicle body. The vehicle body includes a frame having a circular opening. The waterproof microphone device includes an outer housing, a circuit board disposed in the outer housing, a microphone mounted on the circuit board, a cover connecting the outer housing and the frame, a first waterproof membrane sealing on the cover, and a casing fixed with the cover. An inner wall of the frame forming the opening gradually slopes inwardly from an outer surface to an inner surface of the frame. The casing includes a first wall facing out of the vehicle body, a second wall opposite to the first wall, and an outer sidewall connecting the first wall and the second wall. The outer sidewall gradually slopes inwardly from the first wall to the second wall to form an inclined annular sound channel between the inner wall of the frame enclosing the opening and the outer sidewall of the casing.

As an improvement, the casing includes at least one recess portion extending from the second wall to the outer sidewall of the casing.

As an improvement, wherein a number of recess portions is multiple, and adjacent recess portions spaced equally apart from each other on the outer sidewall.

As an improvement, wherein the cover includes a main body portion covered with the outer housing and a protruding portion arranged on the main body portion, the protruding portion provided with a receiving groove communicated to the sound channel, and the main body portion provided with a first through-hole communicated to the receiving groove.

As an improvement, wherein the receiving groove includes a central portion and at least three extension portions diffused outwardly from the central portion, the first through-hole arranged relative to one of the extension portions.

As an improvement, wherein the receiving groove has a T-shaped structure, a Y-shaped structure, a cross shaped structure, or a flower shaped structure.

As an improvement, wherein a surrounding wall of the protruding portion forming the receiving groove is an arc-shaped structure.

As an improvement, wherein the waterproof microphone device further includes a sealing ring located between the cover and the circuit board and a second waterproof membrane arranged between the sealing ring and the main body portion of the cover, the sealing ring provided with a second through-hole communicated to the first through-hole of the cover.

As an improvement, wherein the circuit board is provided with a third through-hole communicated to the second through-hole, the microphone located on a lower surface of the circuit board.

As an improvement, the cover is provided with a plurality of installation columns extending from the protruding portion, the installation columns penetrating through the first waterproof membrane and fixedly connected to the casing.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
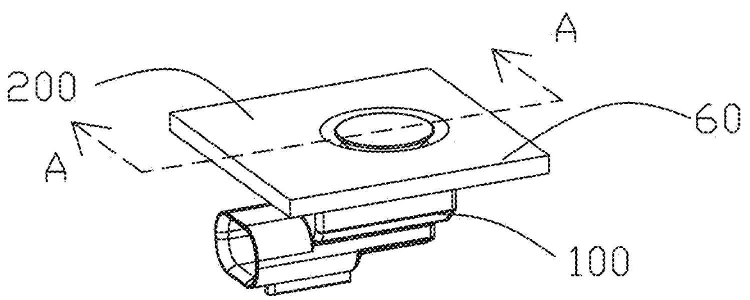
FIG. 1 is an illustrative isometric view of a waterproof microphone device in accordance with one embodiment of the present invention.
Figure 2:
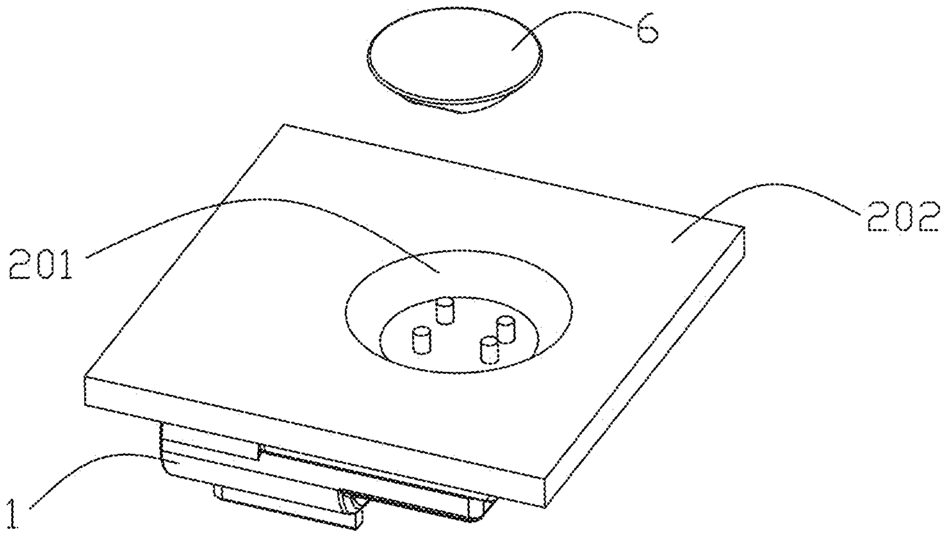
FIG. 2 is a partly exploded view of the waterproof microphone device of FIG. 1.
Figure 3:
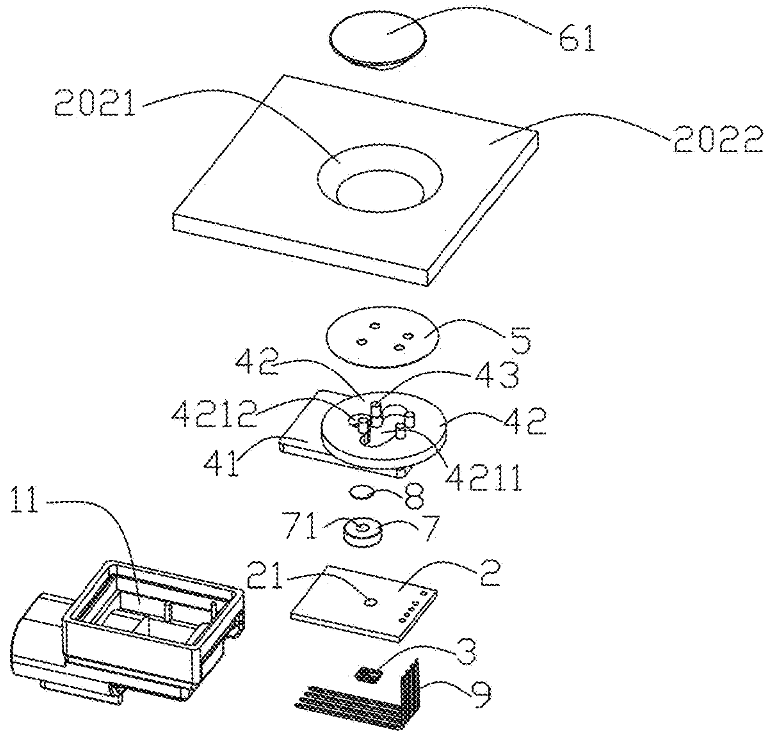
FIG. 3 is an exploded view of the waterproof microphone device of FIG. 1.
Figure 4:
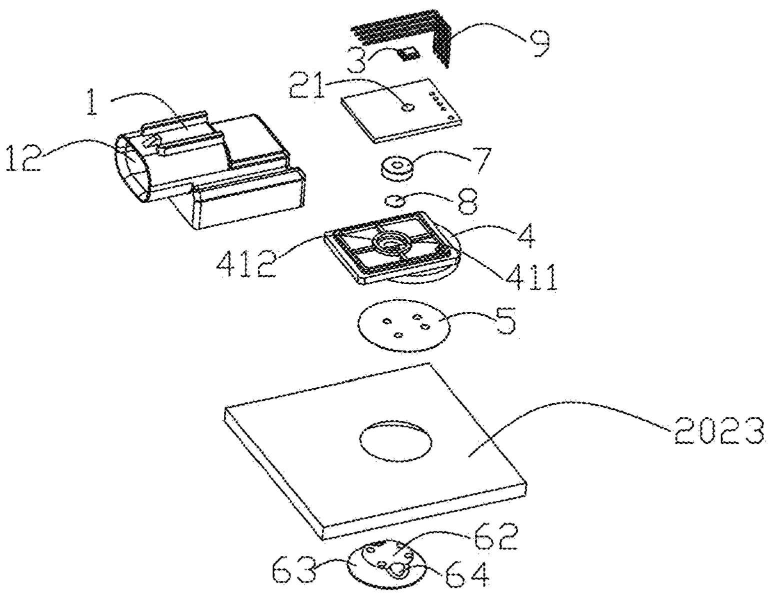
FIG. 4 is an exploded view of the waterproof microphone device from another perspective of FIG. 1.
Figure 5:
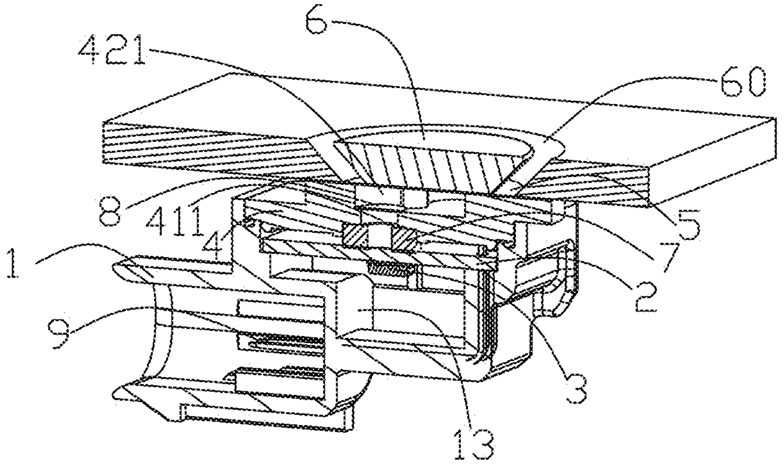
FIG. 5 is an illustrative cross-sectional view of the waterproof microphone device taken along line A-A of FIG. 1.

Referring to the FIGS. 1-5, the present invention provides one embodiment of a waterproof microphone device 100. The waterproof microphone device 100 is installed on a vehicle body 200. The vehicle body 200 includes a frame 202 having a circular opening 201. The waterproof microphone device 100 includes an outer housing 1, a circuit board 2 disposed in the outer housing 1, a microphone 3 mounted on the circuit board 2, a cover 4 connecting the outer housing 1 and the frame 202, a first waterproof membrane 5 sealing on the cover 4, a casing 6 fixed with the cover 4, a sealing ring 7 located between the cover 4 and the circuit board 2, a second waterproof membrane 8 arranged between the sealing ring 7 and cover 4, and a plurality of connector pins 9.

The out housing 1, the circuit board 2, the microphone 3, the cover 4, the first waterproof membrane 5, the sealing ring 7, the second waterproof membrane 8, and the connector pins 9 are disposed in the vehicle body 200. The waterproof microphone device 100 can be installed on the vehicle body 200 near the car door, car lights, or other locations.

An inner wall 2021 of the frame 202 forming the opening 201 gradually slopes inwardly from an outer surface 2022 to an inner surface 2023 of the frame 202. That is, an aperture of the opening 201 gradually decreases from the outer surface 2022 to the inner surface 2023. As the opening 201 is a circular or an elliptical shape, the inner wall 2021 is a smooth curved inclined plane.

The casing 6 is a circular or an elliptical shape corresponding to the opening 201. The casing 6 includes a first wall 61 facing out of the vehicle body 200, a second wall 62 opposite to the first wall 61, and an outer sidewall 63 connecting the first wall 61 and the second wall 62. The first wall 61 of the casing 6 is flush with the outer surface 2022 of the frame 202. The outer sidewall 63 gradually slopes inwardly from the first wall 61 to the second wall 62, forming an inclined annular sound channel 60 between the inner wall 2021 of the frame 202 enclosing the opening 201 and the outer sidewall 63 of the casing 6. In this way, when the vehicle is in motion, an airflow flows through the annular sound channel 60, resulting in less turbulent energy and lower wind noise.

The casing 6 includes at least one recess portion 64 extending from the second wall 62 to the outer sidewall 63 of the casing 6, and the recess portion 64 does not extend to the first wall 61 of the casing 6. A number of recess portions 64 is multiple, and adjacent recess portions 64 are spaced equally apart from each other on the outer sidewall 63. The surface that forms the recess portion 64 is also a smooth curved surface, and the recess portions 64 ensure a sufficient width of the sound channel 60, at the same time, the recess portion 64 reduces high-frequency resonance.

The out housing 1 includes a first containment portion 11 for accommodating the circuit board 2, the microphone 3, the sealing ring 7, and the second waterproof membrane 8, and a second containment portion 12 separated from the first containment portion 11. The out housing 1 further includes a stop wall 13 separating the first containment portion 11 and the second containment portion 12. One end of each connector pin 9 is electrically connected to the circuit board 2, and the other end of the connector pin 9 extends into the second containment portion 12.

The circuit board 2 is supported on an inner wall of the out housing 1. The microphone 3 is located on a lower surface of the circuit board 2. The microphone 3 is a MEMS microphone or other types of microphones.

The cover 4 and the first waterproof membrane 5 are covered on the out housing 1 and sealed the first containment portion 11. The cover 4 includes a main body portion 41 covered with the outer housing 1 and a protruding portion 42 arranged on the main body portion 41. The main body portion 41 has a substantially rectangular shape, and the protruding portion 42 has a substantially circular shape. The protruding portion 42 is provided with a receiving groove 421 communicated to the sound channel 60, and the main body portion 41 is provided with a first through-hole 411 communicated to the receiving groove 421.

The receiving groove 421 includes a central portion 4211 and at least three extension portions 4212 diffused outwardly from the central portion 4211. The first through-hole 411 is arranged relative to one of the extension portions 4212. The receiving groove 421 has a T-shaped structure, a Y-shaped structure, a cross shaped structure, or a flower shaped structure, etc. That is, the shape formed by the central portion 4211 and the extension portion 4212 is T-shaped, Y-shaped, cross shaped, or flower shaped, etc. The surrounding wall of the protruding portion 42 forming the receiving groove 421 is an arc-shaped structure.

When washing the vehicle or on rainy days, water flows enter from one extension portion 4212 of the receiving groove 421, and the generated air pressure is released from another extension portion 4212 of the receiving groove, avoiding the damage to the microphone 3. At the same time, the water flows pass through the annular sound channel 60, reducing the impact on the first waterproof membrane 5. Due to the instability of water flows in the annular hole, the water flow is easy to detach under the push of airflow or gravity, therefore, the residual liquid in the receiving groove 421 can also flow out in any direction of the sound channel 60, thereby avoiding the retention of the liquid. During vehicle operation, the continuous flow of gas in the sound channel 60 promotes the evaporation and discharge of condensed water, while also avoiding the retention of the liquid.

The cover 4 is provided with a plurality of installation columns 43 extending from the protruding portion 42, and the installation columns 43 penetrates through the first waterproof membrane 5 and fixedly connected to the casing 6, thereby achieving the installation of the casing 6. An installation groove 412 is provided on one side of the main body 41 of the cover 4 away from the protruding portion 42, and the installation groove 412 is communicated with the first through-hole 411. The sealing ring 7 is installed inside the installation groove 412.

The sealing ring 7 is provided with a second through-hole 71 communicated to the first through-hole 411 of the cover 4. The second waterproof membrane 8 locates between the second through-hole 71 of the sealing ring 7 and the first through-hole 411 of the cover 4.

The circuit board 2 is provided with a third through-hole 21 communicated to the second through-hole 71. The process of collecting sound is that, the sound entering from the sound channel 60 and sequentially passing through the receiving groove 421, the first through-hole 411, the second through-hole 71, and the third through-hole 21, and finally reaching the microphone 3.

Comparing with the related art, the present invention provides a waterproof microphone device. The waterproof microphone device is installed on a vehicle body. The vehicle body includes a frame having a circular opening. The waterproof microphone device includes an outer housing, a circuit board disposed in the outer housing, a microphone mounted on the circuit board, a cover connecting the outer housing and the frame, a first waterproof membrane sealing on the cover, and a casing fixed with the cover. An inner wall of the frame forming the opening gradually slopes inwardly from an outer surface to an inner surface of the frame. The casing includes a first wall facing out of the vehicle body, a second wall opposite to the first wall, and an outer sidewall connecting the first wall and the second wall. The outer sidewall gradually slopes inwardly from the first wall to the second wall to form an inclined annular sound channel between the inner wall of the frame enclosing the opening and the outer sidewall of the casing.

In present invention, when the vehicle is in motion, an airflow flows through the annular sound channel, resulting in less turbulent energy and lower wind noise. When washing the vehicle or on rainy days, water flows enter from one extension portion of the receiving groove, and the generated air pressure is released from another extension portion of the receiving groove, avoiding the damage to the microphone. At the same time, the water flows pass through the annular sound channel, reducing the impact on the first waterproof membrane and extended its service life. The residual liquid in the receiving groove can also flow out in any direction of the sound channel, thereby avoiding the retention of the liquid. During vehicle operation, the continuous flow of gas in the sound channel promotes the evaporation and discharge of condensed water, while also avoiding the retention of the liquid. At the same time, the waterproof microphone device of this invention has a beautiful appearance.

It is to be understood, however, that even though numerous characteristics and advantages of the present exemplary embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A waterproof microphone device, the waterproof microphone device installed on a vehicle body, and the vehicle body comprising a frame having a circular opening, the waterproof microphone device comprising:

an outer housing;

a circuit board disposed in the outer housing;

a microphone mounted on the circuit board;

a cover connecting the outer housing and the frame;

a first waterproof membrane sealing on the cover; and a casing fixed with the cover, the casing comprising:

a first wall facing out of the vehicle body;

a second wall opposite to the first wall; and an outer sidewall connecting the first wall and the second wall;

wherein an inner wall of the frame forming the opening gradually slopes inwardly from an outer surface to an inner surface of the frame, and the outer sidewall gradually slopes inwardly from the first wall to the second wall to form an inclined annular sound channel between the inner wall of the frame enclosing the opening and the outer sidewall of the casing.

2. The waterproof microphone device as described in claim 1, wherein the casing comprises at least one recess portion extending from the second wall to the outer sidewall of the casing.

3. The waterproof microphone device as described in claim 2, wherein a number of recess portions is multiple, and adjacent recess portions spaced equally apart from each other on the outer sidewall.

4. The waterproof microphone device as described in claim 1, wherein the cover comprises a main body portion covered with the outer housing and a protruding portion arranged on the main body portion, the protruding portion provided with a receiving groove communicated to the sound channel, and the main body portion provided with a first through-hole communicated to the receiving groove.

5. The waterproof microphone device as described in claim 4, wherein the receiving groove comprises a central portion and at least three extension portions diffused outwardly from the central portion, the first through-hole arranged relative to one of the extension portions.

6. The waterproof microphone device as described in claim 5, wherein the receiving groove has a T-shaped structure, a Y-shaped structure, a cross shaped structure, or a flower shaped structure.

7. The waterproof microphone device as described in claim 5, wherein a surrounding wall of the protruding portion forming the receiving groove is an arc-shaped structure.

8. The waterproof microphone device as described in claim 4, wherein the waterproof microphone device further comprises a sealing ring located between the cover and the circuit board and a second waterproof membrane arranged between the sealing ring and the main body portion of the cover, the sealing ring provided with a second through-hole communicated to the first through-hole of the cover.

9. The waterproof microphone device as described in claim 8, wherein the circuit board is provided with a third through-hole communicated to the second through-hole, the microphone located on a lower surface of the circuit board.

10. The waterproof microphone device as described in claim 4, wherein the cover is provided with a plurality of installation columns extending from the protruding portion, the installation columns penetrating through the first waterproof membrane and fixedly connected to the casing.

* * * * *